United States Patent [19]

Audeh et al.

[11] 4,191,639
[45] Mar. 4, 1980

[54] PROCESS FOR DEASPHALTING HYDROCARBON OILS

[75] Inventors: Costandi A. Audeh; George C. Johnson, both of Princeton, N.J.

[73] Assignee: Mobil Oil Corporation, New York, N.Y.

[21] Appl. No.: 929,588

[22] Filed: Jul. 31, 1978

[51] Int. Cl.$^2$ ............................................... C10G 21/06
[52] U.S. Cl. ............................... 208/309; 208/251 R
[58] Field of Search ................... 208/251 R, 208, 309

[56] References Cited
U.S. PATENT DOCUMENTS

| | | | |
|---|---|---|---|
| 3,516,928 | 6/1970 | King et al. | 208/309 |
| 3,723,297 | 3/1973 | Gatsis et al. | 208/309 |
| 4,054,512 | 10/1977 | Dugan | 208/309 |

Primary Examiner—Herbert Levine
Attorney, Agent, or Firm—Charles A. Huggett; Vincent J. Frilette

[57] ABSTRACT

Hydrocarbon oils such as residual petroleum oils are efficiently deasphalted and demetallized with recovery of high quality asphalt by contact with a liquid mixture of at least two of the components selected from hydrogen sulfide, carbon dioxide and propane. The recovered deasphalted oil, which is characterized by reduced metal and sulfur content, may be used as charge stock to the fluid catalytic cracking process or to the hydrocracking process.

6 Claims, No Drawings

PROCESS FOR DEASPHALTING HYDROCARBON OILS

BACKGROUND OF THE INVENTION

1. Field of the Invention

This invention is concerned with an improved process for deasphalting asphalt-containing hydrocarbon oils. In particular, it is concerned with solvent-deasphalting of residual oils with a liquid solvent composition that contains at least 10 volume percent of hydrogen sulfide or carbon dioxide and propane.

2. Description of the Prior Art

Atmospheric or vacuum distillation of petroleum oils produces a residual fraction which may represent, depending on the crude, as much as 50 volume percent of the crude charged. With suitable crudes, particularly those designated paraffinic or naphthenic, the residuum can be processed to yield lubricant base stock oils. Often, however, the residuum is not so suited and must be converted by coking or disposed of as low-grade fuel.

In any case, the residuum from atmospheric or vacuum distillation contains the non-volatile asphaltene fraction of the crude as well as almost all of the metal contaminants and a large fraction of the sulfur content of the whole crude. These asphaltic, metal and sulfur constituents are generally regarded as impurities, and in general they detrimentally affect processes that might otherwise be used to convert the residual oil to more desirable products. The asphaltene fraction, for example, which is present in a dispersed state in the crude, tends to flocculate with the deposition of insoluble coke or sludge, especially on heating. Thus, this impurity is undesirable in high grade lubricants and must be removed. The use of an untreated residual oil as chargestock to the catalytic cracking process is detrimental to efficient operation because the nickel and vanadium impurities present in the oil deposit and build up on the cracking catalyst with loss of selectivity and even loss of plant capacity in many cases. Catalytic demetallation processes conducted in the presence of added hydrogen have been proposed for removing metals from residual oils, but these processes in general have minimal effect on the Conradson Carbon value which is usually directly related to asphaltene content. Thus, even with catalytically demetallized residual oil, use of such oil as feedstock to a catalytic cracker to convert it to gasoline results in a high coke load on the regenerator, which in turn limits the throughout capacity of the cracking unit. Thus, it is evidently desirable to remove the asphaltene fraction from residual oils with reduction of the other contaminants if possible, and with production of high grade asphalt by-product.

Solvent-deasphalting of residuum is well known in the art and many solvents and solvent combinations have been suggested for this process. Most commonly, light hydrocarbon solvents containing 3 to 5 carbon atoms in the molecule such as propane, propylene, butene, butane, pentene, pentane and mixtures thereof and used either alone or in admixture with other solvents such as ketones, liquid $SO_2$, cresol and diethyl carbonate. Typical of prior art deasphalting processes is the process described in U.S. Pat. No. 2,337,448 in which a heavy residuum is deasphalted by contacting it at elevated temperature with a deasphalting solvent such as ethane, ethylene, propane, propylene, butane, butylene, isobutane, and mixtures thereof. The entire contents of the U.S. Pat. No. 2,337,448 are incorporated herein by reference.

The term "deasphalting" is used herein in the conventional sense, i.e. to signify a process wherein a tar fraction containing asphaltenes is removed from an oil. This tar fraction contains the bulk of the metal-bearing porphyrins contained in the crude. Thus, the deasphalting process is also a demetallizing process, and is to be so understood herein.

Propane is the solvent most often used in deasphalting operations. However, propane-deasphalting is somewhat limited in that it will extract only about 40 to 60 percent of a petroleum residuum, and the tar fraction resulting from this process, which amounts to about half of the residuum, is unsuitable for use except as an ingredient in the blending and production of heavy fuel oils. Additional refining treatments must be employed with the tar fraction in order to more effectively separate the asphalt and release additional deasphalted oil from this fraction. Generally, use of the higher molecular weight aliphatic hydrocarbons such as butane and pentane will result in a greater yield of deasphalted oil and produce asphalt with a higher softening point. However, as one uses solvent of increasing molecular weight and/or boiling point, one loses the advantage of the facile stripping under mild conditions that is obtainable with the low-boiling propane.

U.S. Pat. No. 4,054,512 to Dugan et al teaches the use of liquid hydrogen sulfide as the deasphalting solvent. That metals may be selectively removed from petroleum residues by extraction with supercritical gases such as propane and carbon dioxide is disclosed by Solomon, Abstracts, Paper No. 28d, page 38, 70th National Meeting, American Institute of Chemical Engineers, Atlantic City, Aug. 29–Sept. 1, 1971.

It is an object of this invention to provide an improved solvent-deasphalting process for treating asphalt-containing mineral oils. It is a further object of this invention to provide novel, highly selective solvent combinations for recovering deasphalted oil and high quality asphalt from a residual petroleum oil. It is a further object of this invention to demetallize and deasphalt residual oils for use as chargestock to the fluid catalytic cracking process. Other objects will be evident from reading this entire specification including the claims thereof.

DESCRIPTION OF THE INVENTION

It is now contemplated to solvent-deasphalt an asphalt-containing mineral oil with a liquid solvent consisting of at least two components selected from the group consisting of hydrogen sulfide, carbon dioxide, and light hydrocarbon, said light hydrocarbon being selected from the group consisting of propane, butanes, pentanes and blends thereof. Thus, both binary and ternary liquid solvents are contemplated. Briefly, the process comprises contacting the asphalt-containing mineral oil with the liquid solvent, in the absence of added hydrogen, in a volume ratio of 1:1 to about 1:20, i.e. one to about 20 volumes of solvent are used for each volume of mineral oil to be treated. The contacting is conducted for a time and at a temperature and pressure more fully described hereinbelow, whereby are formed a liquid phase containing solvent and deasphalted oil and a separate liquid phase rich in tar. The immiscible phases are separated, followed by recovery of deasphalted oil and asphalt from the respective phases. The advantage provided by the binary or ternary liquid solvent of this invention is an increase in selectivity over that achieved with a single solvent consisting of hydrogen sulfide, carbon dioxide or light hydrocarbon used alone. The binary or ternary solvent of this invention also is characterized by being easily separated from the deasphalted oil and the tar-rich phases, thereby minimizing cost and reducing solvent loss.

The process of this invention is particularly well suited for the deasphalting of atmospheric tower or vacuum tower bottoms from the distillation of petroleum oils, commonly known as residual oils or residua. However, petroleum crude oils, and topped crude oils, as well as other petroleum hydrocarbon oils that contain an asphaltic component, may be treated by the method of this invention. Additionally, heavy oils derived from tar sands, shale, or other sources, may likewise be treated.

Any conventional method of contacting the asphaltene-containing mineral oil with the binary or ternary liquid solvent of this invention may be used. For example, batch contacting is effective. Countercurrent contacting and separation of the phases, as is commonly practiced in propane deasphalting, may be used. In this latter method of contacting, the asphalt-containing mineral oil, which in some cases may advantageously be mixed with a small amount of the solvent to promote fluidity, is fed continuously at an intermediate point in a packed tower. Concurrently, the binary or ternary solvent of this invention is fed at a point below the intermediate point, and flows upwardly through the tower wherein it contacts the fed and forms two liquid phases, one rich in oil and the other rich in tar. The oil phase flows upwardly and is removed from the top of the tower, while the tar phase flows downwardly and is removed from the bottom of the tower.

The liquid solvent of this invention consists of two components or three components, as hereinabove described, each of the components being present in an amount equal to at least 10 percent of the total volume of the solvent. The components of the liquid solvent are selected from the group consisting of hydrogen sulfide, carbon dioxide, and light hydrocarbon, said light hydrocarbon consisting essentially of propane, butane, pentane, or blends of these hydrocarbons. For the purpose of this invention, it is particularly preferred that the light hydrocarbon consist essentially of propane. Thus, in its preferred form, it is contemplated that this invention utilizes a binary solvent consisting of hydrogen sulfide and carbon dioxide; or hydrogen sulfide and propane; or carbon dioxide and propane. The preferred ternary composition consists of hydrogen sulfide, carbon dioxide, and propane. For each of the binary solvents, the composition contains 10 to 90 percent by volume of one component, with the remainder, 90 to 10% by volume, being the second component. The ternary liquid solvent contains at least 10 volume percent each of hydrogen sulfide, carbon dioxide, and propane. As will be recognized by those skilled in the art, the critical temperatures and pressures of hydrogen sulfide, carbon dioxide, and lighthydrocarbon are different from one another. Since the present invention contemplates contacting asphalt-containing mineral oil with liquid solvent, the contacting must be done at a temperature lower than the critical temperature, and at a pressure sufficiently high to maintain the binary or ternary solvent in the liquid phase during the contacting step, and until the phases are separated. After separation of the phases, the liquid solvent is removed from each of the phases by conventional means, whereby recovery of deasphalted oil, and tar comprising asphaltenes, aromatic hydrocarbons, heterocyclic nitrogen and sulfur compounds and metal-containing compounds, are effected. Alternatively, the tar phase may be subjected to additional treatment prior to removal of the liquid solvent in order to modify or separate the constituents thereof.

When using mixtures of hydrogen sulfide and light hydrocarbon as the binary solvent in the process of this invention, it is preferred to conduct the contacting step and separation of the phases at a temperature of less than about 60° C., and at a pressure of at least about 400 p.s.i.g., said pressure being effective to maintain the solvent in the liquid phase. In some instances temperatures of 60° C. to 80° C. may be used, however. The precise temperature to be used will depend on the mineral oil to be deasphalted, the volume ratio of solvent to mineral oil, the equipment chosen, and the extent of deasphalting and/or demetallization desired. The selection of operating conditions based on a few routine experiments is a procedure well known to those of skill in the art. The critical conditions for mixtures of hydrogen sulfide and propane have been reported in the literature by W. B. Kay and G. M. Rambosek, Ind. Eng. Chem. 45, 221–226 (1953), the entire contents of which are incorporated herein by reference. Table I is derived from that publication and is reproduced here for convenience.

TABLE I

| Critical Conditions for $H_2S$-Propane Mixtures | | |
|---|---|---|
| Mol. % Propane in Mixture | Critical Pressure, lb./sq. in. | Critical Temperatures, °C. |
| 0 | 1297.1 | 99.9 |
| 10.16 | 1159.5 | 92.7 |
| 21.83 | 1040.2 | 87.5 |
| 32.45 | 956.2 | 84.9 |
| 43.59 | 887.6 | 84.6 |
| 56.58 | 821.7 | 85.7 |
| 70.14 | 759.2 | 88.5 |
| 83.67 | 695.0 | 92.0 |
| 100.0 | 616.3 | 96.7 |

When using binary or ternary mixtures other than hydrogen sulfide and light hydrocarbon, it is necessary to conduct the contacting at a temperature of less than about 100° C., and preferably at a temperature less than about 35° C., with a pressure of at least about 1000 p.s.i.g. The critical conditions for mixtures of hydrogen sulfide and carbon dioxide have been reported in the literature by J. A. Bierlein and W. B. Kay, Ind. Eng. Chem. 45, 618–623 (1953), the entire contents of which are incorporated herein be reference. Table II is derived from that reference and is reproduced here for convenience.

TABLE II

| Critical Conditions for $H_2S$-$CO_2$ Mixtures | | |
|---|---|---|
| Mol. Fraction $CO_2$ | Critical Pressure, lb./in.$^2$ | Critical Temperatures °C. |
| 0 | 1306 | 100.38 |
| .0630 | 1305 | 93.50 |
| .1614 | 1302 | 84.16 |
| .2608 | 1284 | 74.48 |
| .3759 | 1245 | 64.74 |
| .4728 | 1207 | 56.98 |
| .6659 | 1129 | 43.72 |
| .8292 | 1085 | 35.96 |

TABLE II-continued
Critical Conditions for H₂S-CO₂ Mixtures

| Mol. Fraction CO$_2$ | Critical Pressure, lb./in.$^2$ | Critical Temperatures °C. |
|---|---|---|
| .9009 | 1076 | 33.53 |
| 1. | 1072 | 31.10 |

This invention will now be illustrated by examples, which examples are not to be construed as limiting the invention described by the present specification including the claims. All parts and ratios given in the examples are by weight unless explicitly stated to be otherwise.

In general, the contacting of the asphaltene-containing mineral oil with the liquid solvent according to this invention is conducted for a time sufficient to insure intimate contact of the oil and solvent, and in general this occurs within a period of less than about 10 minutes in a single stage batch apparatus. In a column operation which effects multistage contacting, each stage generally will require less than about 10 minutes for effective contacting. Thus, the contacting step does not require extensive time except when the mineral oil is extremely viscous, in which case it is preferred to premix the oil with an amount of solvent effective to reduce the viscosity of the mineral oil, said amount being insufficient to induce phase separation. The reducing solvent preferably is chosen from the group consisting of liquid hydrogen sulfide, liquid carbon dioxide, liquid light hydrocarbon, and mixtures thereof.

For purposes of the present invention, the deasphalting solvent is preferably substantially anhydrous, and precautions should be taken to avoid entry of moisture into the process during the contacting and separation steps.

EXAMPLE 1

A residual oil obtained by vacuum distillation of an Arabian crude was deasphalted in a continuous unit using propane as a solvent.

The residual oil had the following properties:

| | |
|---|---|
| Gravity, °API | 9.6 |
| Specific Gravity at 60/60° F. | 1.0028 |
| Carbon Residue, % Wt (Conradson) | 12.5 |
| Nickel, ppm | 16 |
| Vanadium, ppm | 72 |

The deasphalting was conducted with a solvent dosage of 600 volume percent, and at an average deasphalting temperature of 50° C. The properties of the recovered deasphalted oil and tar were as follows:

| Deasphalted Oil | |
|---|---|
| Yield, % Vol. | 66.8 |
| Gravity, °API | 16.6 |
| Specific Gravity at 60/60° F. | 0.9554 |
| Carbon Residue, % Wt (Conradson) | 7.6 |
| Nickel, ppm | 1.5 |
| Vanadium, ppm | 8.4 |

| Tar | |
|---|---|
| Yield (by difference) | 33.2 |
| Carbon Residue, % Wt (Conradson) | 20 |
| Nickel, ppm | 30 |
| Vanadium, ppm | 155 |

EXAMPLE 2

The same feed is used as in Example 1, under the same process conditions but, instead of propane, the solvent is a mixture of H$_2$S/Propane in the ratio of 1/9 vol. The yields and properties of the recovered deasphalted oil and tar are:

| Deasphalted Oil | |
|---|---|
| Yield, % Vol. | 72 |
| Gravity, °API | 16.6 |
| Specific Gravity at 60/60° F. | 0.9554 |
| Carbon Residue, % Wt (Conradson) | 7.6 |
| Nickel, ppm | 1.5 |
| Vanadium, ppm | 8.4 |

| Tar | |
|---|---|
| Yield, % Vol. (by difference) | 28 |
| Carbon Residue, % Wt (Conradson) | 24 |
| Nickel, ppm | 50 |
| Vanadium, ppm | 190 |

EXAMPLE 3

The same feed is used as in Example 1, under the same process conditions but, instead of propane, the solvet is a mixture of CO$_2$/Propane in the ratio 2/8 vol. The yields and properties of the recovered deasphalted oil and tar are:

| Deasphalted Oil | |
|---|---|
| Yield, % Vol. | 69 |
| Gravity, °API | 16.6 |
| Specific Gravity 60/60° F. | 0.9554 |
| Carbon Residue, % Wt (Conradson) | 7.6 |
| Nickel, ppm | 1.5 |
| Vanadium, ppm | 8.4 |

| Tar | |
|---|---|
| Yield, % Vol. (by difference) | 31 |
| Carbon Residue, % Wt (Conradson) | 22 |
| Nickel, ppm | 40 |
| Vanadium, ppm | 170 |

EXAMPLE 4

The same feed is used as in Example 1, under the same process conditions but, instead of propane, the solvent is a mixture of H$_2$S/CO$_2$/Propane in the ratio of 2/2/6 vol. The yields and properties of the recovered deasphalted oil and tar are:

| Deasphalted Oil | |
|---|---|
| Yield, % Vol. | 78 |
| Gravity, °API | 16.6 |
| Specific Gravity, 60/60° F. | 0.9554 |
| Carbon Residue, % Wt (Conradson) | 7.6 |
| Nickel, ppm | 1.5 |

| -continued | |
|---|---|
| Deasphalted Oil | |
| Vanadium, ppm | 8.4 |

| Tar | |
|---|---|
| Yield, % Vol. (by difference) | 22 |
| Carbon Residue, % Wt (Conradson) | 27 |
| Nickel, ppm | 60 |
| Vanadium, ppm | 200 |

What is claimed is:

1. In the process for deasphalting an asphaltene-containing mineral oil, which process comprises contacting said oil with a liquid deasphalting solvent under conditions of temperature and pressure effective to form two liquid phases, a deasphalted oil phase and a tar phase, separating said liquid phases and recovering deasphalted oil from said deasphalted oil phase, the improvement which comprises utilizing a liquid deasphalting solvent consisting of at least two components selected from the group consisting of hydrogen sulfide, carbon dioxide, and light hydrocarbon, said light hydrocarbon being selected from the group consisting of propane, butanes, pentanes, and blends thereof, each of said components being present in an amount equal to at least 10 percent of the total volume of said liquid solvent, and contacting said oil with said liquid solvent at a temperature less than the critical temperature, and a pressure greater than the critical pressure, of said liquid solvent.

2. The process of claim 1 wherein said liquid deasphalting solvent consists of hydrogen sulfide and carbon dioxide.

3. The process of claim 1 wherein said liquid deasphalting solvent consists of hydrogen sulfide and propane.

4. The process of claim 1 wherein said liquid deasphalting solvent consists of carbon dioxide and propane.

5. The process of claim 1 wherein said liquid deasphalting solvent consists of hydrogen sulfide, carbon dioxide, and light hydrocarbon.

6. The process of claim 5 wherein said light hydrocarbon is propane.

* * * * *